US012609348B2

(12) United States Patent
Sakaida et al.

(10) Patent No.: US 12,609,348 B2
(45) Date of Patent: *Apr. 21, 2026

(54) SOLID ELECTROLYTE MATERIAL AND BATTERY USING SAME

(71) Applicant: Panasonic Intellectual Property Management Co., Ltd., Osaka (JP)

(72) Inventors: Masashi Sakaida, Hyogo (JP); Yoshimasa Nakama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 776 days.

This patent is subject to a terminal disclaimer.

(21) Appl. No.: 17/939,970

(22) Filed: Sep. 8, 2022

(65) Prior Publication Data

US 2023/0006248 A1 Jan. 5, 2023

Related U.S. Application Data

(63) Continuation of application No. PCT/JP2020/047890, filed on Dec. 22, 2020.

(30) Foreign Application Priority Data

Mar. 18, 2020 (JP) ................................. 2020-048457

(51) Int. Cl.
*H01M 10/0562* (2010.01)
*C01G 25/00* (2006.01)
(Continued)

(52) U.S. Cl.
CPC ... *H01M 10/0562* (2013.01); *H01M 10/0525* (2013.01); *H01M 2300/0068* (2013.01); *H01M 2300/0094* (2013.01)

(58) Field of Classification Search
CPC ......... H01M 10/0562; H01M 10/0525; H01M 2300/0068; H01M 2300/0094; H01M 2300/008; H01M 4/13; H01M 4/62; H01M 10/052; H01M 4/136; H01M 4/58; H01M 10/0561; H01M 2300/0065; C01G 25/006; Y02E 60/10; H01B 1/06
See application file for complete search history.

(56) References Cited

U.S. PATENT DOCUMENTS

2008/0268348 A1 10/2008 Katoh
2013/0071745 A1 3/2013 Mun et al.
(Continued)

FOREIGN PATENT DOCUMENTS

CN 102867988 A 1/2013
JP 2006-156284 6/2006
(Continued)

OTHER PUBLICATIONS

International Search Report of PCT application No. PCT/JP2020/047890 dated Feb. 2, 2021.
(Continued)

*Primary Examiner* — Jeffrey T Barton
*Assistant Examiner* — Gigi Lee Lin
(74) *Attorney, Agent, or Firm* — Greenblum & Bernstein, P.L.C.

(57) ABSTRACT

The solid electrolyte material includes Li, Ti, Zr, and F.

6 Claims, 4 Drawing Sheets

(51) Int. Cl.
| | |
|---|---|
| *H01B 1/06* | (2006.01) |
| *H01M 4/13* | (2010.01) |
| *H01M 4/62* | (2006.01) |
| *H01M 10/0525* | (2010.01) |

(56) References Cited

U.S. PATENT DOCUMENTS

| | | | |
|---|---|---|---|
| 2017/0309964 A1* | 10/2017 | Iwamoto | ........... H01M 10/0565 |
| 2020/0075993 A1 | 3/2020 | Ling et al. | |
| 2020/0350624 A1 | 11/2020 | Sasaki et al. | |
| 2022/0416295 A1* | 12/2022 | Jung | ................ H01M 10/0562 |

FOREIGN PATENT DOCUMENTS

| | | |
|---|---|---|
| JP | 2008-277170 | 11/2008 |
| JP | 2011-129312 | 6/2011 |
| WO | 2011/073798 | 6/2011 |
| WO | 2019/146217 | 8/2019 |

OTHER PUBLICATIONS

The EPC Office Action dated Oct. 9, 2023 for the related European Patent Application No. 20926272.4.

* cited by examiner

1000

201

202

203

204

100

100

205

2000

201

212

222

202

203

SOLID ELECTROLYTE MATERIAL AND BATTERY USING SAME

BACKGROUND

1. Technical Field

The present disclosure relates to a solid electrolyte material and a battery using it.

2. Description of the Related Art

Japanese Unexamined Patent Application Publication No. 2011-129312 discloses an all solid battery using a sulfide solid electrolyte. Japanese Unexamined Patent Application Publication No. 2008-277170 discloses $LiBF_4$ as a fluoride solid electrolyte material.

SUMMARY

One non-limiting and exemplary embodiment provides a solid electrolyte material having a high lithium ion conductivity.

In one general aspect, the techniques disclosed here feature a solid electrolyte material including Li, Ti, Zr, and F.

The present disclosure provides a solid electrolyte material having a high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figures 1, 2:
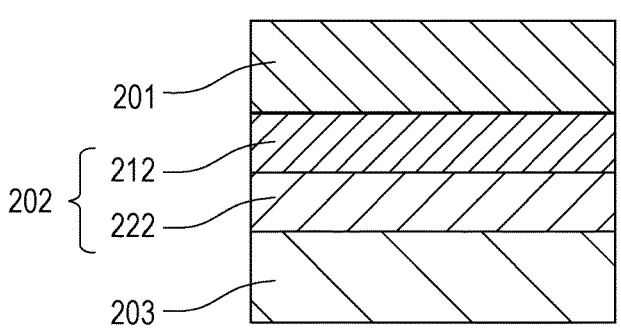
FIG. 1 is a cross-sectional view of a battery 1000 according to a second embodiment.
FIG. 2 is a cross-sectional view of a battery 2000 according to the second embodiment.

Embodiments of the present disclosure will now be described with reference to the drawings.

First Embodiment

The solid electrolyte material according to a first embodiment includes Li, Ti, Zr, and F. The solid electrolyte material according to the first embodiment has a high lithium ion conductivity. Here, a high lithium ion conductivity is, for example, $1\times10^{-8}$ S/cm or more. That is, the solid electrolyte material according to the first embodiment can have an ion conductivity of, for example, $1\times10^{-8}$ S/cm or more.

The solid electrolyte material according to the first embodiment can be used for obtaining a battery having excellent charge and discharge characteristics. An example of the battery is an all solid battery. The all solid battery may be a primary battery or may be a secondary battery.

The solid electrolyte material according to the first embodiment desirably does not contain sulfur. A solid electrolyte material not containing sulfur does not generate hydrogen sulfide, even if it is exposed to the atmosphere, and is therefore excellent in safety. The sulfide solid electrolyte disclosed in Japanese Unexamined Patent Application Publication No. 2011-129312 may generate hydrogen sulfide when exposed to the atmosphere.

The solid electrolyte material according to the first embodiment contains F and can therefore have a high resistance to oxidation. This is because F has a high redox potential. At the same time, since F has a high electronegativity, the bond with Li is relatively strong. As a result, generally, the lithium ion conductivity of the solid electrolyte material containing Li and F is low. For example, $LiBF_4$ disclosed in Japanese Unexamined Patent Application Publication No. 2008-277170 has a low ion conductivity of $6.67\times10^{-9}$ S/cm. Incidentally, $LiBF_4$ is the solid electrolyte material used in Comparative Example 1 described later. In contrast, the solid electrolyte material according to the first embodiment further includes Ti and Zr, in addition to Li and F, and thereby can have a high ion conductivity of, for example, $1\times10^{-8}$ S/cm or more.

In order to enhance the ion conductivity of the solid electrolyte material, the solid electrolyte material according to the first embodiment may include an anion other than F. Examples of the anion are Cl, Br, I, O, S, and Se.

The solid electrolyte material according to the first embodiment may consist essentially of Li, Ti, Zr, and F. Here, the phrase "the solid electrolyte material according to the first embodiment consists essentially of Li, Ti, Zr, and F" means that the molar proportion (i.e., molar fraction) of the sum of the amounts of Li, Ti, Zr, and F to the sum of the amounts of all elements constituting the solid electrolyte material according to the first embodiment is 90% or more. As an example, the molar proportion may be 95% or more. The solid electrolyte material according to the first embodiment may consist of Li, Ti, Zr, and F only.

The solid electrolyte material according to the first embodiment may contain elements that are unavoidably mixed. Examples of the elements are hydrogen, oxygen, and nitrogen. These elements can be present in the raw material powders of the solid electrolyte material or in the atmosphere for manufacturing or storing the solid electrolyte material.

In order to further enhance the ion conductivity of the solid electrolyte material, in the solid electrolyte material according to the first embodiment, the ratio of the amount of Li to the sum of the amounts of Ti and Zr may be 2.0 or more and 6.0 or less.

The solid electrolyte material according to the first embodiment may be represented by a composition formula (1): $Li_{6-4b}(Ti_{1-x}Zr_x)_bF_6$, where mathematical expressions: $0<x<1$ and $0<b\leq1.5$ are satisfied. The solid electrolyte material having such a composition has a high ion conductivity.

In order to enhance the ion conductivity of the solid electrolyte material, in the formula (1), a mathematical expression: $0.1\leq x\leq0.8$ may be satisfied.

The upper limit and lower limit of the range of x in the formula (1) can be defined by an arbitrary combination selected from the numerical values of 0.1, 0.2, 0.4, 0.5, 0.6, 0.67, and 0.8.

In order to enhance the ion conductivity of the solid electrolyte material, in the formula (1), a mathematical expression: $0.6 \leq b \leq 1.0$ may be satisfied. In order to further enhance the ion conductivity of the solid electrolyte material, a mathematical expression: $0.8 \leq b \leq 0.92$ may be satisfied.

The upper limit and lower limit of the range of b in the formula (1) can be defined by an arbitrary combination selected from the numerical values of 0.6, 0.8, 0.85, 0.86, 0.92, and 1.0.

The solid electrolyte material according to the first embodiment may be crystalline or amorphous.

The shape of the solid electrolyte material according to the first embodiment is not limited. Examples of the shape are needle, spherical, and oval spherical shapes. The solid electrolyte material according to the first embodiment may be a particle. The solid electrolyte material according to the first embodiment may be formed so as to give a pellet or planar shape.

For example, when the solid electrolyte material according to the first embodiment has a particulate (e.g., spherical) shape, the solid electrolyte material may have a median diameter of 0.1 μm or more and 100 μm or less. The median diameter means the particle diameter at which the accumulated volume is equal to 50% in a volume-based particle size distribution. The volume-based particle size distribution is measured with, for example, a laser diffraction measurement apparatus or an image analyzer The solid electrolyte material according to the first embodiment may have a median diameter of 0.5 μm or more and 10 μm or less. Consequently, the solid electrolyte material has a higher conductivity. Furthermore, when the solid electrolyte material according to the first embodiment is mixed with another material such as an active material, a good dispersion state of the solid electrolyte material according to the first embodiment and the additional material is obtained.

Method for Manufacturing Solid Electrolyte Material

The solid electrolyte material according to the first embodiment can be manufactured by, for example, the following method.

Raw material powders are prepared and mixed so as to give a target composition. The raw material powders may be, for example, halides.

As an example, when the target composition is $Li_{2.8}Ti_{0.4}Zr_{0.4}F_6$, LiF, $TiF_4$, and $ZrF_4$ are mixed at a molar ratio of about 2.8:0.4:0.4. The raw material powders may be mixed at a molar ratio adjusted in advance so as to offset a composition change that may occur in the synthesis process.

The raw material powders are mechanochemically reacted (i.e., by a mechanochemical milling method) with each other in a mixing apparatus such as a planetary ball mill to obtain a reaction product. The reaction product may be heat-treated in vacuum or in an inert atmosphere. Alternatively, a mixture of the raw material powders may be heat-treated in vacuum or in an inert atmosphere to obtain a reaction product. The heat treatment is preferably performed, for example, at 100° C. or more and 300° C. or less for 1 hour or more. In order to suppress the composition change due to heat treatment, the raw material powders are preferably heat-treated in an airtight container such as a quartz tube.

The solid electrolyte material according to the first embodiment is obtained by these methods.

Second Embodiment

A second embodiment will now be described. The matters described in the first embodiment may be omitted as appropriate.

The battery according to the second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte material according to the first embodiment. The battery according to the second embodiment contains the solid electrolyte material according to the first embodiment and therefore has excellent charge and discharge characteristics. The battery may be an all solid battery.

FIG. 1 is a cross-sectional view of a battery 1000 according to the second embodiment.

The battery 1000 according to the second embodiment includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material. The electrolyte material is, for example, a solid electrolyte material.

The negative electrode 203 contains a negative electrode active material particle 205 and a solid electrolyte particle 100.

The solid electrolyte particle 100 is a particle consisting of the solid electrolyte material according to the first embodiment or a particle containing the solid electrolyte material according to the first embodiment as a main component. Here, the particle containing the solid electrolyte material according to the first embodiment as a main component means a particle in which the most abundant component by mass ratio is the solid electrolyte material according to the first embodiment.

The positive electrode 201 contains a material that can occlude and release metal ions (e.g., lithium ions). The material is, for example, a positive electrode active material (e.g., the positive electrode active material particle 204).

Examples of the positive electrode active material are a lithium-containing transition metal oxide, a transition metal fluoride, a polyanionic material, a fluorinated polyanionic material, a transition metal sulfide, a transition metal oxysulfide, and a transition metal oxynitride. Examples of the lithium-containing transition metal oxide are $Li(Ni,Co,Al)O_2$, $Li(Ni,Co,Mn)O_2$, and $LiCoO_2$. In the present disclosure, the notation of "(Ni,Co,Al)" in a chemical formula shows at least one element selected from the elements in the parentheses. That is, "(Ni,Co,Al)" is synonymous with "at least one selected from the group consisting of Ni, Co, and Al". The same is applied to other elements.

The positive electrode active material particle 204 may have a median diameter of 0.1 μm or more and 100 μm or less. When the positive electrode active material particle 204 has a median diameter of 0.1 μm or more, the dispersion state of the positive electrode active material particle 204 and the solid electrolyte particle 100 in the positive electrode 201 is improved. Consequently, the charge and discharge characteristics of the battery 1000 are improved. When the positive electrode active material particle 204 has a median diameter of 100 μm or less, the lithium diffusion speed in the positive electrode active material particle 204 is improved. Consequently, the battery 1000 can operate at a high output.

The positive electrode active material particle 204 may have a median diameter larger than that of the solid electrolyte particle 100. Consequently, the dispersion state of the positive electrode active material particle 204 and the solid electrolyte particle 100 in the positive electrode 201 is improved.

In order to increase the energy density and output of the battery, in the positive electrode 201, the ratio of the volume of the positive electrode active material particle 204 to the sum of the volume of the positive electrode active material particle 204 and the volume of the solid electrolyte particle 100 may be 0.30 or more and 0.95 or less.

A coating layer may be formed on at least part of the surface of the positive electrode active material particle 204. The coating layer may be formed on the surface of the positive electrode active material particle 204, for example, before mixing a conductive assistant and a binder. Examples of the coating material included in the coating layer are a sulfide solid electrolyte, an oxide solid electrolyte, and a halide solid electrolyte. When the solid electrolyte particle 100 contains a sulfide solid electrolyte, in order to suppress the oxidative decomposition of the sulfide solid electrolyte, the coating material may contain the solid electrolyte material according to the first embodiment. When the solid electrolyte particle 100 contains the solid electrolyte material according to the first embodiment, in order to suppress oxidative decomposition of the solid electrolyte material, the coating material may contain an oxide solid electrolyte. As the oxide solid electrolyte, lithium niobate, which has excellent high-potential stability, may be used. An increase in the overpotential of the battery can be suppressed by suppressing the oxidative decomposition of the solid electrolyte material.

In order to increase the energy density and output of the battery, the positive electrode 201 may have a thickness of 10 μm or more and 500 μm or less.

The electrolyte layer 202 contains an electrolyte material. The electrolyte material is, for example, a solid electrolyte material. The electrolyte layer 202 may be a solid electrolyte layer.

The electrolyte layer 202 may be constituted of the solid electrolyte material according to the first embodiment only. Alternatively, the electrolyte layer 202 may be constituted of only a solid electrolyte material that is different from the solid electrolyte material according to the first embodiment. Examples of the solid electrolyte material that is different from the solid electrolyte material according to the first embodiment are $Li_2MgX_4$, $Li_2FeX_4$, $Li(Al,Ga,In)X_4$, $Li_3(Al,Ga,In)X_6$, and LiI. Here, X is at least one selected from the group consisting of F, Cl, Br, and I.

Hereinafter, the solid electrolyte material according to the first embodiment is referred to as a first solid electrolyte material. The solid electrolyte material that is different from the solid electrolyte material according to the first embodiment is referred to as a second solid electrolyte material.

The electrolyte layer 202 may contain not only the first solid electrolyte material but also the second solid electrolyte material. The first solid electrolyte material and the second solid electrolyte material may be uniformly dispersed in the electrolyte layer 202. A layer made of the first solid electrolyte material and a layer made of the second solid electrolyte material may be stacked along the stacking direction of the battery 1000.

FIG. 2 is a cross-sectional view of a battery 2000 according to the second embodiment.

As shown in FIG. 2, the battery 2000 may include a positive electrode 201, a first electrolyte layer 212, a second electrolyte layer 222, and a negative electrode 203. That is, the electrolyte layer 202 may include a first electrolyte layer 212 and a second electrolyte layer 222. The first electrolyte layer 212 is disposed between the positive electrode 201 and the negative electrode 203. The second electrolyte layer 222 is disposed between the first electrolyte layer 212 and the negative electrode 203.

In the battery 2000, the first electrolyte layer 212 may contain the solid electrolyte material according to the first embodiment. Since the solid electrolyte material according to the first embodiment has a high resistance to oxidation, the solid electrolyte material included in the second electrolyte layer 222 can be used without being oxidized. As a result, the charge and discharge efficiency of a battery can be improved.

In the battery 2000, the solid electrolyte material included in the second electrolyte layer 222 may have a reduction potential lower than that of the solid electrolyte material included in the first electrolyte layer 212. Consequently, the solid electrolyte material included in the first electrolyte layer 212 can be used without being reduced. As a result, the charge and discharge efficiency of a battery can be improved. For example, when the first electrolyte layer 212 contains the solid electrolyte material according to the first embodiment, in order to suppress the reductive decomposition of the solid electrolyte material, the second electrolyte layer 222 may contain a sulfide solid electrolyte.

In order to increase the energy density and output of the battery, the electrolyte layer 202 may have a thickness of 1 μm or more and 1000 μm or less.

The negative electrode 203 contains a material that can occlude and release metal ions (e.g., lithium ions). The material is, for example, a negative electrode active material (e.g., the negative electrode active material particle 205).

Examples of the negative electrode active material are a metal material, a carbon material, an oxide, a nitride, a tin compound, and a silicon compound. The metal material may be a single metal or may be an alloy. Examples of the metal material are a lithium metal and a lithium alloy. Examples of the carbon material are natural graphite, coke, carbon under graphitization, a carbon fiber, spherical carbon, artificial graphite, and amorphous carbon. From the viewpoint of capacity density, preferable examples of the negative electrode active material are silicon (Si), tin (Sn), a silicon compound, and a tin compound.

The negative electrode active material may be selected considering reduction resistance of the solid electrolyte material included in the negative electrode 203. For example, when the negative electrode 203 contains the solid electrolyte material according to the first embodiment, the negative electrode active material may be a material that can occlude and release lithium ions at 0.27 V or more with respect to lithium. Examples of such negative electrode active materials are a titanium oxide, an indium metal, and a lithium alloy. Examples of titanium oxide are $Li_4Ti_5O_{12}$, $LiTi_2O_4$, and $TiO_2$. The solid electrolyte material according to the first embodiment included in the negative electrode 203 can be suppressed from being reductively decomposed by using the above-mentioned negative electrode active material. As a result, the charge and discharge efficiency of a battery can be improved.

The negative electrode active material particle 205 may have a median diameter of 0.1 μm or more and 100 μm or less. When the negative electrode active material particle 205 has a median diameter of 0.1 μm or more, the dispersion state of the negative electrode active material particle 205 and the solid electrolyte particle 100 in the negative electrode 203 is improved. Consequently, the charge and discharge characteristics of the battery are improved. When the negative electrode active material particle 205 has a median diameter of 100 μm or less, the lithium diffusion speed in the negative electrode active material particle 205 is improved. Consequently, the battery can operate at a high output.

The negative electrode active material particle 205 may have a median diameter larger than that of the solid electrolyte particle 100. Consequently, the dispersion state of the negative electrode active material particle 205 and the solid electrolyte particle 100 in the negative electrode 203 is improved.

In order to increase the energy density and output of the battery, in the negative electrode 203, the ratio of the volume of the negative electrode active material particle 205 to the sum of the volume of the negative electrode active material particle 205 and the volume of the solid electrolyte particle 100 may be 0.30 or more and 0.95 or less.

In order to increase the energy density and output of the battery, the negative electrode 203 may have a thickness of 10 μm or more and 500 μm or less.

At least one selected from the group consisting of the positive electrode 201, the electrolyte layer 202, and the negative electrode 203 may contain the second solid electrolyte material for the purpose of enhancing the ion conductivity, chemical stability, and electrochemical stability.

The second solid electrolyte material may be a sulfide solid electrolyte.

Examples of the sulfide solid electrolyte are $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

When the electrolyte layer 202 contains the solid electrolyte material according to the first embodiment, in order to suppress the reductive decomposition of the solid electrolyte material, the negative electrode 203 may contain a sulfide solid electrolyte. The solid electrolyte material according to the first embodiment is prevented from coming into contact with the negative electrode active material by coating the negative electrode active material with an electrochemically stable sulfide solid electrolyte. As a result, the internal resistance of a battery can be reduced.

The second solid electrolyte material may be an oxide solid electrolyte.

Examples of the oxide solid electrolyte are:

(i) an NASICON-type solid electrolyte, such as $LiTi_2(PO_4)_3$ or its element substitute;

(ii) a perovskite-type solid electrolyte, such as $(LaLi)TiO_3$;

(iii) an LISICON-type solid electrolyte, such as $Li_{14}ZnGe_4O_{16}$, $Li_4SiO_4$, $LiGeO_4$, or their element substitutes;

(iv) a garnet-type solid electrolyte, such as $Li_7La_3Zr_2O_{12}$ or its element substitute; and (v) $Li_3PO_4$ or its N-substitute.

As described above, the second solid electrolyte material may be a halide solid electrolyte.

Examples of the halide solid electrolyte are $Li_2MgX_4$, $Li_2FeX_4$, $Li(Al,Ga,In)X_4$, $Li_3(Al,Ga,In)X_6$, and LiI. Here, X is at least one selected from the group consisting of F, Cl, Br, and I.

Other examples of the halide solid electrolyte material are compounds represented by $Li_aMe_bY_cX_6$. Here, a+mb+3c=6 and c>0 are satisfied. Me is at least one selected from the group consisting of metal elements excluding Li and Y and metalloid elements, and m represents the valence of Me. The "metalloid elements" are B, Si, Ge, As, Sb, and Te. The "metal elements" are all elements included in Groups 1 to 12 of the periodic table (however, hydrogen is excluded) and all elements included in Groups 13 to 16 in the periodic table (however, B, Si, Ge, As, Sb, Te, C, N, P, O, S, and Se are excluded).

In order to enhance the ion conductivity of the halide solid electrolyte material, Me may be at least one selected from the group consisting of Mg, Ca, Sr, Ba, Zn, Sc, Al, Ga, Bi, Zr, Hf, Ti, Sn, Ta, and Nb. The halide solid electrolyte may be $Li_3YCl_6$ or $Li_3YBr_6$.

The second solid electrolyte material may be an organic polymer solid electrolyte.

Examples of the organic polymer solid electrolyte are compounds of polymer compounds and lithium salts.

The polymer compound may have an ethylene oxide structure. A polymer compound having an ethylene oxide structure can contain a large amount of a lithium salt and can therefore further enhance the ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used.

At least one selected from the group consisting of the positive electrode 201, the electrolyte layer 202, and the negative electrode 203 may contain a nonaqueous electrolyte liquid, a gel electrolyte, or an ionic liquid for the purpose of facilitating the transfer of lithium ions and improving the output characteristics of the battery.

The nonaqueous electrolyte liquid includes a nonaqueous solvent and a lithium salt dissolved in the nonaqueous solvent.

Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent are ethylene carbonate, propylene carbonate, and butylene carbonate. Examples of the chain carbonate ester solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is ethyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these solvents may be used alone. Alternatively, a mixture of two or more nonaqueous solvents selected from these solvents may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used. The concentration of the lithium salt is, for example, within a range of 0.5 mol/L or more and 2 mol/L or less.

As the gel electrolyte, a polymer material impregnated with a nonaqueous electrolyte liquid can be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:

(i) aliphatic chain quaternary salts, such as tetraalkylammonium and tetraalkylphosphonium;

(ii) aliphatic cyclic ammoniums, such as pyrrolidiniums, morpholiniums, imidazoliniums, tetrahydropyrimidiniums, piperaziniums, and piperidiniums; and (iii) nitrogen-containing heterocyclic aromatic cations, such as pyridiniums and imidazoliums.

Examples of the anion included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

At least one selected from the group consisting of the positive electrode 201, the electrolyte layer 202, and the negative electrode 203 may contain a binder for the purpose of improving the adhesion between individual particles.

Examples of the binder are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. As the binder, a copolymer can also be used. Examples of such the binder are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more materials selected from the above-mentioned materials may be used as the binder.

At least one of the positive electrode 201 and the negative electrode 203 may contain a conductive assistant for reducing the electron resistance.

Examples of the conductive assistant are:

(i) graphites, such as natural graphite and artificial graphite;

(ii) carbon blacks, such as acetylene black and Ketjen black;

(iii) conductive fibers, such as carbon fibers and metal fibers;

(iv) carbon fluoride;

(v) metal powders, such as aluminum;

(vi) conductive whiskers, such as zinc oxide and potassium titanate;

(vii) conductive metal oxides, such as titanium oxide; and (viii) conductive polymer compounds, such as polyanion, polypyrrole, and polythiophene. In order to reduce the cost, the conductive assistant of the above (i) or (ii) may be used.

Examples of the shape of the battery according to the second embodiment are coin type, cylindrical type, square type, sheet type, button type, flat type, and stacked type.

The battery according to the second embodiment may be manufactured by, for example, preparing a material for forming a positive electrode, a material for forming an electrolyte layer, and a material for forming a negative electrode and producing a stack of a positive electrode, an electrolyte layer, and a negative electrode disposed in this order by a known method.

EXAMPLES

The present disclosure will now be described in more detail with reference to Examples and Comparative Examples.

Example 1

Production of Solid Electrolyte Material

LiF, $TiF_4$, and $ZrF_4$ were prepared as raw material powders at a molar ratio, $LiF:TiF_4:ZrF_4$, of 2.8:0.4:0.4 in an argon atmosphere having a dew point of $-60°$ C. or less (hereinafter, referred to as "dry argon atmosphere"). These materials were pulverized and mixed in a mortar. The resulting mixture was subjected to milling treatment with a planetary ball mill at 500 rpm for 12 hours. Thus, a solid electrolyte material powder of Example 1 was obtained. The solid electrolyte material of Example 1 had a composition represented by $Li_{2.8}Ti_{0.4}Zr_{0.4}F_6$.

Evaluation of Ion Conductivity

Figure 3:
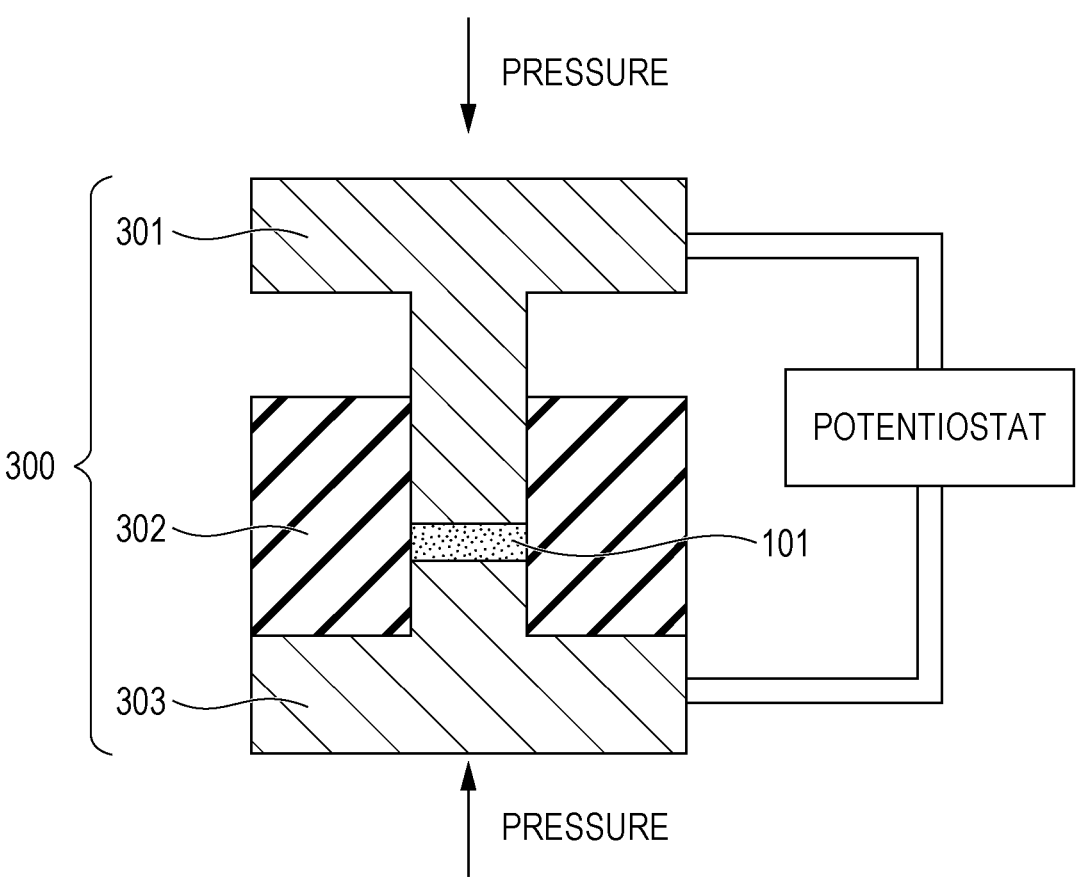
FIG. 3 is a schematic view of a compression molding dies 300 used for evaluation of the ion conductivity of a solid electrolyte material.

FIG. 3 is a schematic view of a compression molding dies 300 used for evaluation of the ion conductivity of a solid electrolyte material.

The compression molding dies 300 included a punch upper part 301, a die 302, and a punch lower part 303. The die 302 was made of insulating polycarbonate. The punch upper part 301 and the punch lower part 303 were made of electron-conductive stainless steel.

The ion conductivity of the solid electrolyte material of Example 1 was evaluated using the compression molding dies 300 shown in FIG. 3 by the following method.

The powder of the solid electrolyte material of Example 1 was loaded inside the compression molding dies 300 in a dry atmosphere having a dew point of $-30°$ C. or less. A pressure of 400 MPa was applied to the solid electrolyte material of Example 1 inside the compression molding dies 300 using the punch upper part 301 and the punch lower part 303.

The punch upper part 301 and the punch lower part 303 were connected to a potentiostat (Princeton Applied Research, VersaSTAT4) equipped with a frequency response analyzer while applying the pressure. The punch upper part 301 was connected to the working electrode and the potential measurement terminal. The punch lower part 303 was connected to the counter electrode and the reference electrode. The impedance of a solid electrolyte material was measured by an electrochemical impedance measurement method at room temperature.

Figure 4:
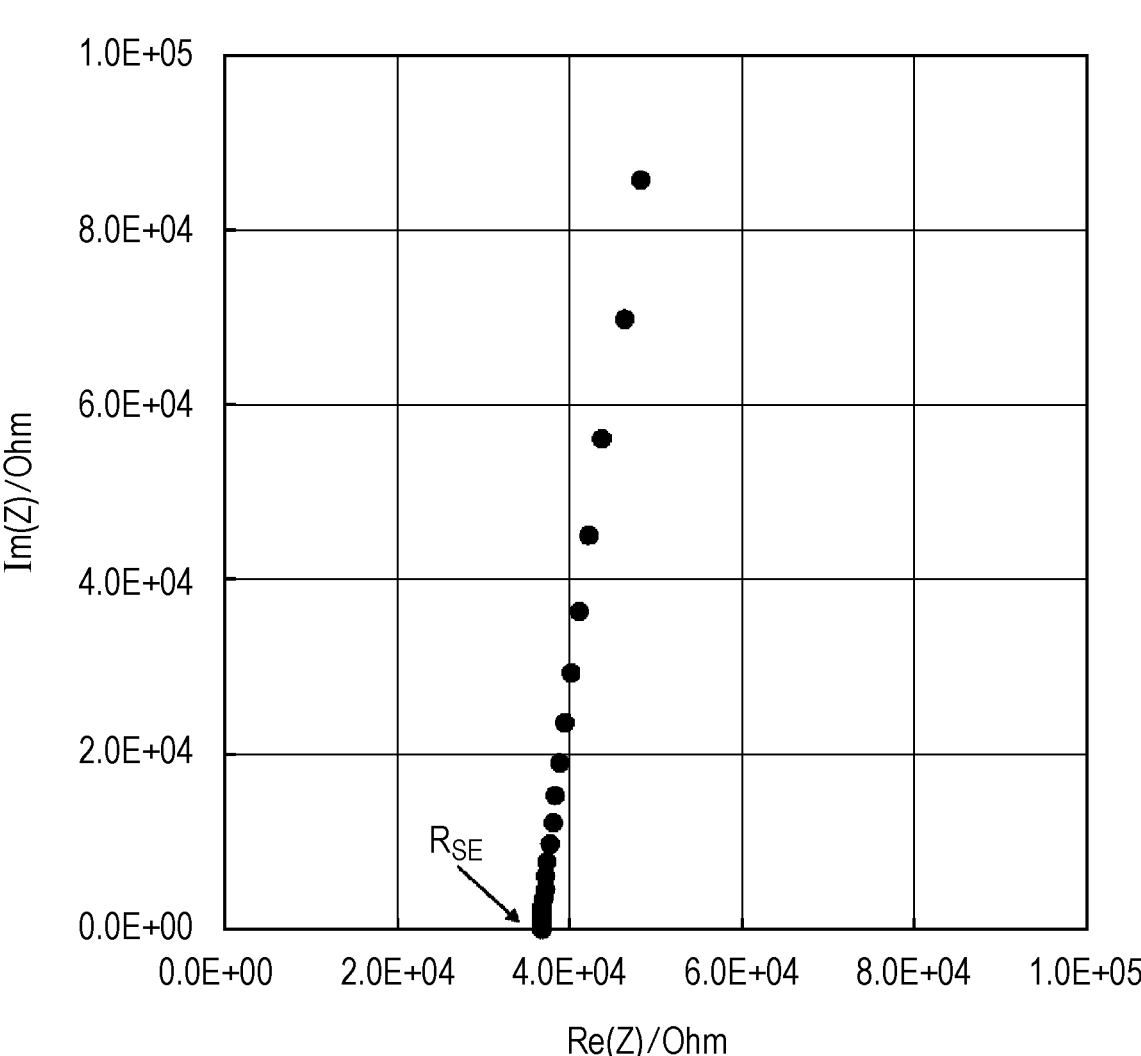
FIG. 4 is a graph showing a Cole-Cole plots obtained by impedance measurement of the solid electrolyte material of Example 1.

FIG. 4 is a graph showing Cole-Cole plots obtained by impedance measurement of the solid electrolyte material of Example 1.

In FIG. 4, the real value of impedance at the measurement point where the absolute value of the phase of the complex impedance was the smallest was regarded as the resistance value to ion conduction of the solid electrolyte material. Regarding the real value, see the arrow $R_{SE}$ shown in FIG. 4. The ion conductivity was calculated using the resistance value based on a mathematical expression (2): $\sigma = (R_{SE} \times S/t)^{-1}$, where $\sigma$ represents ion conductivity; S represents the contact area of a solid electrolyte material with the punch upper part 301 (equal to the cross-sectional area of the hollow part of the die 302 in FIG. 3); $R_{SE}$ represents the resistance value of the solid electrolyte material in impedance measurement; and t represents the thickness of the solid electrolyte material (i.e., in FIG. 3, the thickness of the layer formed from the powder 101 of the solid electrolyte material).

The ion conductivity of the solid electrolyte material of Example 1 measured at $25°$ C. was $1.94 \times 10^{-6}$ S/cm.

Production of Battery

The solid electrolyte material of Example 1 and $LiCoO_2$ as an active material were prepared at a volume ratio of 30:70 in a dry argon atmosphere. These materials were mixed in an agate mortar. Thus, a positive electrode mixture was obtained.

Subsequently, LiCl and $YCl_3$ were prepared at a molar ratio, $LiCl:YCl_3$, of 3:1. These materials were pulverized and mixed in a mortar. The resulting mixture was subjected to milling treatment with a planetary ball mill at 500 rpm for 12 hours. Thus, a halide solid electrolyte having a composition represented by $Li_3YCl_6$ (hereinafter, referred to as "LYC") was obtained.

LYC (60 mg), the solid electrolyte material (26 mg) of Example 1, and the above-described positive electrode mixture (9.1 mg) were stacked in this order in an insulating tube having an inner diameter of 9.5 mm. A pressure of 300 MPa was applied to the resulting stack to form a second electrolyte layer, a first electrolyte layer, and a positive electrode. That is, a first electrolyte layer made of the solid electrolyte material of Example 1 was sandwiched between a second electrolyte layer and a positive electrode. The second electrolyte layer and the first electrolyte layer had thicknesses of 450 μm and 150 μm, respectively.

Subsequently, metal In (thickness: 200 μm) was stacked on the second electrolyte layer. A pressure of 80 MPa was applied to the resulting stack to form a negative electrode.

Subsequently, a current collector made of stainless steel was attached to the positive electrode and the negative electrode, and a current collecting lead was attached to the current collector.

Finally, the inside of the insulating tube was isolated from the outside atmosphere using an insulating ferrule to seal the inside of the tube. Thus, a battery of Example 1 was obtained.

Charge and Discharge Test

Figure 5:
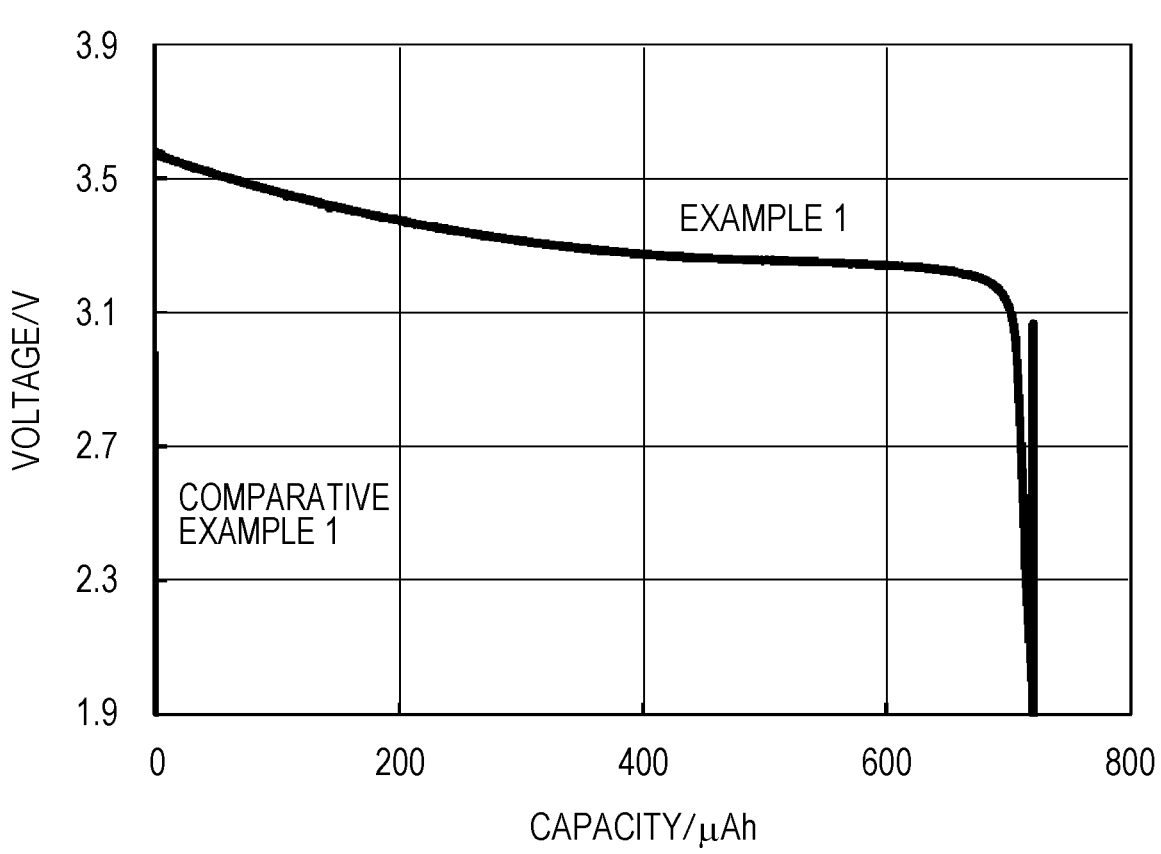
FIG. 5 is a graph showing the initial discharge characteristics of batteries of Example 1 and Comparative Example 1.

FIG. 5 is a graph showing the initial discharge characteristics of the battery of Example 1. The initial charge and discharge characteristics were measured by the following method.

The battery of Example 1 was placed in a thermostat of 85° C.

The battery of Example 1 was charged at a current density of 27 μA/cm² until the voltage reached 3.6 V. The current density corresponded to 0.02 C rate.

Subsequently, the battery of Example 1 was discharged at a current density of 27 μA/cm² until the voltage reached 1.9 V.

As the results of the charge and discharge test, the battery of Example 1 had an initial discharge capacity of 720 μAh.

Examples 2 to 11

Production of Solid Electrolyte Material

In Examples 2 to 11, LiF, $TiF_4$, and $ZrF_4$ were prepared as raw material powders at a molar ratio, $LiF:TiF_4:ZrF_3$, of $(6-4b):(1-x)b:xb$.

Solid electrolyte materials of Examples 2 to 11 were obtained as in Example 1 except the above matters.

Regarding the solid electrolyte materials of Examples 2 to 11, the values of x, b, and Li/(Ti+Zr) molar ratio are shown in Table 1.

Evaluation of Ion Conductivity

The ion conductivities of the solid electrolyte materials of Examples 2 to 11 were measured as in Example 1. The measurement results are shown in Table 1.

Charge and Discharge Test

Batteries of Examples 2 to 11 were obtained as in Example 1 using the solid electrolyte materials of Examples 2 to 11.

The batteries of Examples 2 to 11 were subjected to a charge and discharge test as in Example 1. The batteries of Examples 2 to 11 were well charged and discharged as in the battery of Example 1.

Comparative Example 1

As the solid electrolyte material, $LiBF_4$ was used instead of $Li_{2.8}Ti_{0.4}Zr_{0.4}F_6$.

The ion conductivity of $LiBF_4$ was measured as in Example 1. The ion conductivity measured at 25° C. was $6.67\times10^{-9}$ S/cm.

A battery of Comparative Example 1 was obtained as in Example 1 using $LiBF_4$ as the solid electrolyte material.

The battery of Comparative Example 1 was subjected to a charge and discharge test as in Example 1. As a result, the battery of Comparative Example 1 had an initial discharge capacity of 0.01 μAh or less. That is, the battery of Comparative Example 1 was neither charged nor discharged.

Table 1 shows the solid electrolyte materials of Examples 1 to 11 and Comparative Example 1 and each evaluation result.

TABLE 1

| | Composition formula | x | b | Li/ (Ti + Zr) molar ratio | Ion conductivity [S/cm] |
|---|---|---|---|---|---|
| Example 1 | $Li_{2.8}Ti_{0.4}Zr_{0.4}F_6$ | 0.5 | 0.8 | 3.50 | $1.94 \times 10^{-6}$ |
| Example 2 | $Li_{2.57}Ti_{0.43}Zr_{0.43}F_6$ | 0.5 | 0.86 | 2.99 | $2.13 \times 10^{-6}$ |
| Example 3 | $Li_2Ti_{0.5}Zr_{0.5}F_6$ | 0.5 | 1 | 2.00 | $3.03 \times 10^{-7}$ |
| Example 4 | $Li_{2.31}Ti_{0.46}Zr_{0.46}F_6$ | 0.5 | 0.92 | 2.51 | $1.02 \times 10^{-6}$ |
| Example 5 | $Li_{2.57}Ti_{0.17}Zr_{0.69}F_6$ | 0.8 | 0.86 | 2.99 | $2.25 \times 10^{-7}$ |
| Example 6 | $Li_{2.57}Ti_{0.28}Zr_{0.57}F_6$ | 0.67 | 0.85 | 3.02 | $3.15 \times 10^{-7}$ |
| Example 7 | $Li_{2.57}Ti_{0.34}Zr_{0.51}F_6$ | 0.6 | 0.86 | 3.02 | $2.98 \times 10^{-7}$ |
| Example 8 | $Li_{2.57}Ti_{0.51}Zr_{0.34}F_6$ | 0.4 | 0.86 | 3.02 | $3.50 \times 10^{-7}$ |
| Example 9 | $Li_{2.57}Ti_{0.69}Zr_{0.17}F_6$ | 0.2 | 0.86 | 2.99 | $2.77 \times 10^{-7}$ |
| Example 10 | $Li_{3.6}Ti_{0.3}Zr_{0.3}F_6$ | 0.5 | 0.6 | 6.00 | $6.85 \times 10^{-7}$ |
| Example 11 | $Li_2Ti_{0.9}Zr_{0.1}F_6$ | 0.1 | 1 | 2.00 | $1.98 \times 10^{-7}$ |
| Comparative Example 1 | $LiBF_4$ | — | — | — | $6.67 \times 10^{-9}$ |

Consideration

The solid electrolyte materials of Examples 1 to 11 have high ion conductivities of $1\times10^{-8}$ S/cm or more at room temperature. In contrast, the solid electrolyte material of Comparative Example has a low ion conductivity of less than $1\times10^{-8}$ S/cm.

In the solid electrolyte materials of Examples 1, 2, 3, 4, and 10, the values of x were the same (i.e., x=0.5). As obvious by comparing Examples 1, 2, and 4 with Examples 3 and 10, in solid electrolyte materials having the same value of x, when $0.8 \leq b \leq 0.92$ is satisfied, the ion conductivity of a solid electrolyte material is further enhanced.

All the batteries of Examples 1 to 11 were charged and discharged at 85° C. In contrast, the battery of Comparative Example 1 was neither charged nor discharged.

Since the solid electrolyte materials of Examples 1 to 11 do not contain sulfur, hydrogen sulfide is not generated.

As described above, the solid electrolyte material of the present disclosure has a high lithium ion conductivity and is suitable for providing a battery that can be well charged and discharged.

The solid electrolyte material of the present disclosure is used in, for example, an all solid lithium ion secondary battery.

What is claimed is:

1. A solid electrolyte material comprising Li, Ti, Zr, and F, wherein the solid electrolyte material is represented by a composition formula:

$$Li_{6-4b}(Ti_{1-x}Zr_x)_bF_6$$

where $0<x<1$ and $0.6<b\leq0.92$ are satisfied.

2. The solid electrolyte material according to claim 1, wherein a ratio of the amount of Li to the sum of the amounts of Ti and Zr is 3.5 or more and 6.0 or less.

3. The solid electrolyte material according to claim 1, wherein a mathematical expression: $0.1\leq x\leq0.8$ is satisfied.

4. The solid electrolyte material according to claim 1, wherein a mathematical expression: $0.8\leq b\leq0.92$ is satisfied.

5. A battery comprising:

a positive electrode;

a negative electrode; and an electrolyte layer disposed between the positive electrode and the negative electrode, wherein at least one selected from the group consisting of the positive electrode, the negative electrode, and the electrolyte layer contains the solid electrolyte material according to claim 1.

6. The battery according to claim 5, wherein the electrolyte layer includes a first electrolyte layer and a second electrolyte layer, the first electrolyte layer is disposed between the positive electrode and the negative electrode, the second electrolyte layer is disposed between the first electrolyte layer and the negative electrode, and the first electrolyte layer contains the solid electrolyte material.

* * * * *